(12) United States Patent
Schoettle et al.

(10) Patent No.: US 6,718,214 B1
(45) Date of Patent: Apr. 6, 2004

(54) METHOD FOR SWITCHING CONSUMER ON OR OFF

(75) Inventors: Richard Schoettle, Oelbronn (DE);
Clemens Schmucker, Tamm (DE);
Torsten Baumann, Massenbuchhausen (DE); Klaus Bolenz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,239
(22) PCT Filed: Dec. 13, 1999
(86) PCT No.: PCT/DE99/03979
§ 371 (c)(1),
(2), (4) Date: Sep. 29, 2000
(87) PCT Pub. No.: WO00/35715
PCT Pub. Date: Jun. 22, 2000

(30) Foreign Application Priority Data

Dec. 15, 1998 (DE) .......................................... 198 57 917

(51) Int. Cl.$^7$ ............................................. G05B 13/02
(52) U.S. Cl. ..................... 700/28; 700/10; 700/17; 700/83; 700/274; 700/275; 700/286; 701/36; 701/99; 320/126; 324/143
(58) Field of Search ..................... 700/10, 17, 83, 700/286, 28, 274, 275; 701/36, 99; 320/126; 324/143

(56) References Cited

U.S. PATENT DOCUMENTS

| 5,384,697 A | * | 1/1995 | Pascucci ....................... 700/10 |
| 5,416,702 A | * | 5/1995 | Kitagawa et al. ............. 701/36 |
| 5,426,589 A | | 6/1995 | Kitamur |
| 5,754,033 A | * | 5/1998 | Thomson ..................... 700/286 |
| 5,875,108 A | * | 2/1999 | Hoffberg et al. .............. 700/17 |

FOREIGN PATENT DOCUMENTS

| DE | 39 36 638 C | 3/1991 |
| DE | 0 884 819 A | 12/1998 |
| EP | 0 601 300 A | 6/1994 |

* cited by examiner

Primary Examiner—Anil Khatri
Assistant Examiner—Thomas Pham
(74) Attorney, Agent, or Firm—Michael J. Striker

(57) ABSTRACT

A method for turning various classes of loads on and off by means of switch elements in the context of energy management performed by a control unit, particularly in a motor vehicle, is described, in which the triggering of the switch elements is done such that the selected priorities for triggering the switch elements can be varied during operation, that is, dynamically. This enables an adaptation of the switching priorities during ongoing operation as a function of the operating state. The turn-off of loads is done by varying the switching priority in such a way that the perceptibility of the operating states is suppressed as much as possible, and the priorities can also be varied in accordance with person-specific criteria.

9 Claims, 1 Drawing Sheet

METHOD FOR SWITCHING CONSUMER ON OR OFF

BACKGROUND OF THE INVENTION

In the on-board electrical system of motor vehicles, the electrical loads are grouped in various classes. There are loads that are absolutely necessary for safe operation and the safety of the vehicle, such as the running lights, engine or other control units, fuel pumps, and so forth. These loads will hereinafter be called "non-controllable loads" (NSVs).

There are also electrical loads where the driver notices immediately or very quickly that they are turned on or off, such as a passenger compartment fan, radio, seat adjuster, windshield defroster, and so forth. These loads will hereinafter be called "conditionally controllable loads" (BSV).

Finally, there are loads that have storage behavior, so that an interruption in the supply of energy or the turning off of the voltage supplying them is not noticed until after a certain period of time. Examples of such loads are a seat heater, rear window defroster, electric supplementary heaters, the cigarette lighter, and so forth. These loads will be called "controllable loads" (SVs). The goal of an energy management system (EM) is to switch the controllable loads, and under certain conditions the conditionally controllable loads BSVs, in such a way that the battery state is or becomes favorable. In addition, with the aid of the energy management (EM), better coupling of the drive train and on-board electrical system should be possible, for instance in order to achieve such functions as drive train relief by deexcitation of the generator during acceleration, or an additionally operative drive train loading during braking by full excitation of the generator.

From German. Patent Disclosure DE-OS 39 36 638, a method is already known in which the loads in a vehicle on-board electrical system are turned off or switched back if a certain load state of the vehicle battery is undershot, so as to prevent the battery from discharging too much. Which load or loads is or will be turned off depends on what group of loads it belongs to. One such group is composed for instance of "conditionally switchable loads" (BSVs) and/or "switchable loads" (SVs). The group is always turned off completely or reduced in terms of consumption. Several groups that contain "BSVs" and/or "SVs" are defined. Each group has a priority pertaining to vehicle safety or to the importance of the group. Turning off or resetting of the individual groups begins with the group having the lowest priority. If this does not improve the charge state of the battery, then further groups are turned off or switched back, until the battery load state reaches a certain level.

In addition, from European Patent Disclosure EP 0 601 300 B1, a method is known in which the resetting or turning off of the electric loads in an on-board vehicle electrical system is dependent on the driving state. The driving states pertain to the vehicle speed and stopping on the one hand and the operating state of the internal combustion engine on the other. On the basis of the signals are information furnished by sensors, a control unit of the vehicle can depend, depending on the vehicle state involved, which types of loads should be turned off or switched back either individually or in groups, simultaneously or in succession in accordance with a predetermined order.

In the above-described methods, only energy economy and maintaining operating and vehicle safety are taken into account. The perceptibility of the operating states, such as a decrease in heating output of the seat heater or other loads to be turned off or reset, is not taken into account since the loads are switched in accordance with a predetermined strategy that is invariable, rather than in accordance with their state.

SUMMARY OF THE INVENTION

The object of the invention is to adapt the switching strategy or prioritizing of the loads even during operation in such a way that the perceptibility of the operating states caused by the switchover is jointly taken into account, and the ndividual adaptation to specifiable criteria is effected, thus overcoming the disadvantages of the prior art. This object is attained by a method of the invention.

The method according to the invention has the advantage that the effects on comfort that can be caused under certain operating conditions by the energy management are reduced or suppressed entirely in terms of being perceptible and thus are not noticed by the vehicle passengers.

This advantage is attained by performing dynamic prioritizing of the load power; that is, a change in priority can optionally be done under certain circumstances even during operation. By measuring or estimating the operating states of the loads, the loads are assigned priorities as a function of the operating state. In accordance with these priorities, initially only loads of the "switchable load" priority are switched, and only until the power deficit is compensated for. Only if that no longer suffices are loads of the "conditionally switchable load" class switched (turned off). This assures that the switching of the loads remains unnoticed (neutral in terms of comfort) by the passengers for as long as possible.

Further advantages of the invention are attained by the provisions recited in the dependent claims. These provisions make it possible for instance for individual loads to change their assigned classes, and this change is advantageously made as a function of time and/or of detected operating states. It is especially advantageous that individual loads can be equipped with a certain intelligence that makes it possible for them to assign themselves to the appropriate class, as a function of their operating state.

The prioritizing of the electric loads can advantageously be done vehicle- and/or person-specifically. Aspects of the future driving cycle can be taken into account and the energy management strategy thus influenced. In suitable equipped vehicles with a navigation system, the information provided by it can also be taken into account in setting the switching priorities. With the aid of learning systems (memory functions), the driver can be recognized and the individual driving behavior or individual load activation or comfort preferences of the particular driver can be ascertained and stored in memory and taken into account on future trips, especially in recurring driving cycles.

The energy management extends advantageously not merely to switching electric loads but also includes mechanical components that can be turned on or off in order to achieve a desired effect, such as rpm adaptation or load optimization. The energy management is advantageously performed by means of a control unit, such as an on-board electrical system control unit.

BRIEF DESCRIPTION OF THE DRAWINGS

One exemplary embodiment of the invention is shown in the drawing and will be described in further detail below. The sole drawing FIGURE schematically shows the components of an on-board vehicle electrical system that are essential to comprehension of the invention.

DESCRIPTION OF THE PREFERRED EMBODIMENTS

Figure 1:
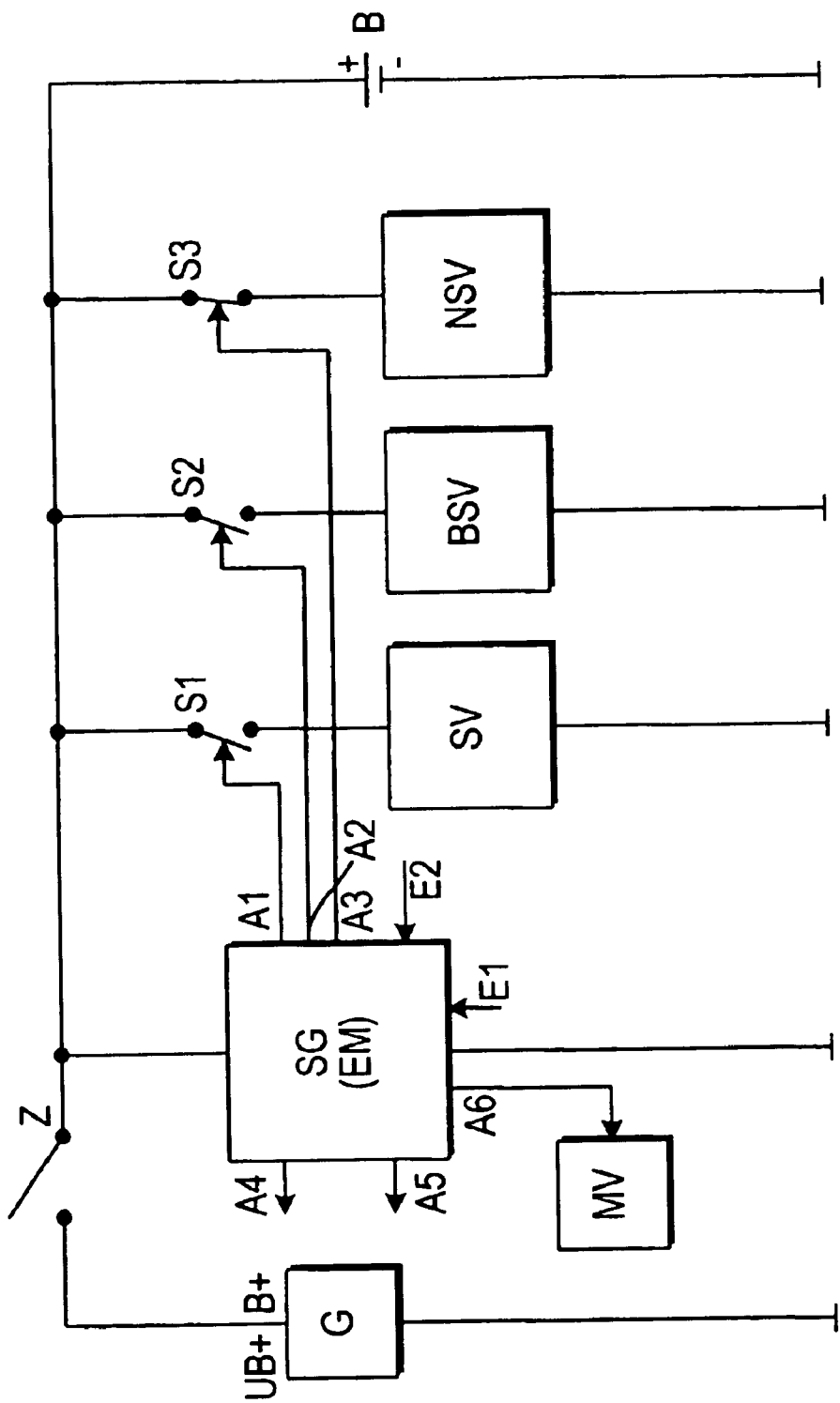

The invention will now be described in terms of the exemplary embodiment shown in the drawing. However, it is not limited to an on-board electrical system for a vehicle but instead in general includes systems in which loads are switched as a function of the operating state.

In the drawing, the components of an on-board vehicle electrical system that are required for comprehension of the invention are shown schematically. The electrical energy for the various electrical loads is furnished by the generator G, which is driven by the engine, not shown. Via the generator terminal B+, the output voltage of the generator UB+ is delivered to the battery B with the ignition switch Z closed.

Of the loads, the "switchable loads" (SVs), "conditionally switchable loads" BSVs, and the "non-switchable loads" NSVs are shown, which can be connected to the battery B via switches S1, S2 and S3 that are triggerable by a control unit SG. The switch S3 remains closed when the engine is in operation. The switches S1, S2 and S3 can also each include a plurality of individually triggerable single switches.

The control unit SG, for instance an engine control unit or an on-board electrical system control unit, as the energy manager, performs the energy management EM. To that end, the control unit SG is supplied with the requisite information for detecting the existing operating states via inputs El, E2, . . . . Via outputs A1, A2 and A3, the switches S1, S2 are actuated, and optionally S3 as well upon turn-off, and the associated loads are turned on and off in accordance with the criteria ascertained in the control unit SG. Via further outputs A4, A5, A6, . . . , the control unit performs further triggering provisions that bring about engine control and/or turn mechanical loads MV on and off. One such mechanical load is an air conditioner compressor, for instance, which can be considered to be a "switchable load" SV and can be switched as a current load in its electrical action and also as a mechanical load, and which can be turned off, for instance in an acceleration phase in order to turn of the braking action. This also applies to the generator, which can be at least partly deexcited upon acceleration.

1. Classification of the Loads

The individual loads, both the electrical and the mechanical ones, are classified in individual classes. Classified in the class of "non-switchable loads" (NSVs), which for instance include the running lights, engine controller or control unit, fuel pump, and a mechanical pump for the power steering, etc.; the class "conditionally switchable loads" (BSVs), which include for instance the heater fan, the radio, a seat adjuster or the windshield defroster, etc., and the class "switchable loads" (SVs), which include for instance a seat heater, rear window defroster, electrical supplementary heater, the cigarette lighter, and the mechanical air conditioner compressor.

The NSV class includes loads that are absolutely necessary for safe movement of the vehicle. They cannot be turned off or reset. This class accordingly has the highest priority. Loads that can be turned off or reset but whose turn-off or resetting is noticed immediately or very quickly by the driver or whose function improves vehicle control belong to the BSV class. It accordingly has a lower priority than the NSV class. The class SV contains loads with storage behavior, whose shutoff or resetting to interrupt the energy supply is not noticed immediately by the driver but only after a specifiable period of time. Thus it has the lowest priority.

The grouping of the individual loads into priority classes is shown in Table 1, for instance. This grouping of priorities shown pertains to the normal state.

2. Changing of the Classes

This grouping of individual loads into the various classes, as given above in the this section by example, pertains as already noted to the normal state. The normal state exists when an adequate energy supply during typical driving operation is assured. If there is a change of state, the individual load cannot enter a class of lower priority than the class to which it belongs when it is in the normal state. However, as a function of its applicable operating state, it can enter a class of higher priority. In Table 2, an example in which a change of priority occurs is shown.

In the example in Table 2, the seat heaters are turned off and on again in alternation, and are thus shifted in alternation from the SV class to BSV and back again. The following scenario is assumed: The passenger and driver have each turned on the seat heater, and the final temperature has been reached. This creates a power deficit at time T1, which is detected by the energy management EM and which can be compensated for by turning off one seat heater. At time T2, the seat heater 2 is turned off. As a result, the seat heater 2 will change its priority in the direction of BSV. At time T3, the seat heater 2 has cooled down enough that the passenger would notice any further cooling. The result is the change of the seat heater to class BSV. The seat heater 2 now has a higher priority than the seat heater 1. At time T4, the seat heater 2 is therefore turned back on again, while the seat heater 1 is turned off. At time T5, the seat heater 2 has warmed up again enough that it can be put back into class SV. The energy saving, on the precondition that the energy suffices for heating at lower power, thus remains unnoticed by the vehicle passengers.

3. Assignment to Classes

The assignment of the loads to the applicable class can be done in various ways. One conceivable way is for an overriding system to detect or estimate the operating state of the applicable consumer on the basis of the signals furnished by sensors or by an observer, the signals being supplied to the control unit SG, which performs the energy management, via the inputs E1, E2, . . . , and thus the overriding system makes the change in the classification if necessary. The change in class membership can also be made after a certain length of ON or OFF time. It is also conceivable that the load may have intelligence and include a microprocessor, for instance, so that it performs its assignment to the appropriate class on its own, as a function of its operating state.

Mechanical Loads

The assignment to classes is not limited to electrical loads only but also applies to mechanical loads. This makes it possible to expand the functions of the energy management EM. For instance, the assignment of a mechanical air conditioner compressor (in the normal state) to the class SV can be utilized to turn the compressor off during an acceleration phase of the motor vehicle, in order to have more power available for propelling the vehicle. It is also conceivable to take the mechanical coupling of the generator to the drive train into account, in order to deexcite the generator during acceleration and excite it fully in a targeted way during braking. In vehicles that have a starter generator connected directly to the crankshaft, acceleration and braking effects can thus be attained especially effectively, and mechanical energy can also be converted back into electrical energy during braking.

The prioritizing of the loads can fundamentally be done vehicle-specifically or also person-specifically, especially taking special comfort preferences into account. The priorities for switching loads are thus not the same for all vehicles of one model series but instead vary as a function of the person, which applies to both turning loads on and turning them off.

In addition, aspects relating to the future driving cycle can be given or taken into account and the energy management strategy can thus be optimized. Provisions for increasing the power production or reducing power consumption, which have effects on fuel consumption or the function and/or comfort, can be employed in a targeted way.

By memory functions in the area of seat position, mirror adjustment, and so forth, and/or other functions of driver recognition, such as access control, passive entry, fingerprints, and so forth, the driver of the vehicle is known to the control unit, which can react to this. With the aid of learning systems, the individual driving behavior or individual load activations (comfort preferences) of the particular driver can be ascertained, stored in memory, and taken into account in the energy management. Furthermore, a certain recurring driving cycle, such as the daily commute to work, can often also be associated with the driver.

By taking these traits into account, it is possible to prioritize the loads in a person-specific way. If comfort is important to one driver, which can be detected from the comfort loads he turns on in the normal state, then the priority of the comfort loads should be raised to above average. A reduction in comfort by turning off comfort relevant loads to improve a critical load balance should be avoided as much as possible in this case. In that case, other provisions can be taken to improve the load balance, and for instance an adaptation of the rpm level for optimal electric power generation should be preferred. For a driver who places less value on comfort but more on driving in a way favorable to low fuel consumption, conversely, comfort loads would more likely be turned off. A change (increase) in the rpm level, which increases fuel consumption, should conversely be avoided as much as possible.

If after a relatively long period of observation or learning phase, a certain driving cycle and thus the rpm level can be assigned to a specific person, then the limits of intervention for improving the load balance can be estimated better. That is, if a critical load state is detected, but a favorable driving cycle for electric power generation can be expected in the near future with a certain statistical certainty, then no provisions for raising the load balance have to be initiated. Such provisions are always associated with increased fuel consumption and/or a loss of functionality or comfort and should therefore be avoided if possible. However, this is not true if a breakdown in the electrical power supply is about to happen; then, provisions that prevent this must be taken.

All in all, the embodiments described involve methods that change the priorities of the loads as a function of their state. The switching of the loads depends on their priority. The priorities of the loads are defined in software, in accordance with the following relationship:

Switching-state=$f$(priority)

Priority=$f$(state of the load)

The switching is done not class by class but rather in such a way that individual loads of one class are switched. The switching is done either successively, in adaptation to the load state, or parallel, if a plurality of loads have to be switched for compensation purposes, or the entire class if necessary. It is always the loads with the lowest priority that are switched first, and only after all the loads with the lowest priority have been switched as loads with the next higher priority switched (turned off).

TABLE 1

Classification of the Loads in Groups by Priority (Example)

| NVS | BSV | SV |
|---|---|---|
| Running lights | Heater fan | Seat heater |
| Engine control defroster unit | Radio | Rear window |
| Fuel pump supplementary | Seat adjuster | Electric heater |
| Etc. | Windshield defroster | Cigarette lighter |
|  | Etc. | Etc. |

The classification of the priorities shown pertains to the normal state.

TABLE 2

An Example of Changing the Membership and Priority Groups

| Time | Action | BSV | SV |
|---|---|---|---|
| T1 (ON) (ON) | (EM detects power power deficit) |  | Seat heater 1 |
|  |  |  | Seat heater 2 |
| T2 (ON) (OFF) | (EM turns seat heater 1 off) | ← | Seat heater 1 Seat heater 2 |
| T3 (ON) | (Heater 2 changes priority) | 2 (OFF) | Seat heater 1 Seat heater |
| T4 (OFF) | (EM switches heater 2 ON and heater 1 OFF) | Seat heater 2 (ON) | Seat heater 1 → |
| T5 (OFF) (ON) | (Priority of heater 2 drops back) | ← | Seat heater 1 Seat heater 2 |

What is claimed is:

1. A method for turning on or off electrical loads in a vehicle on-board electrical system, by means of switch elements which are triggerable in such a way by a controller that the electrical loads are turned on or off taking switching priorities into account, characterized in that the electrical loads are grouped in classes of different switching priorities and the grouping of the electrical loads is done based on a normal state, the grouping of the electrical loads in classes with the switching priorities is variable dynamically during operation as a function of the operating state of the electrical loads, and the electrical loads can change their class belonging during the operation, wherein the switching of loads is performed by a control unit (SG) of a vehicle, and the loads are electrical and optionally also mechanical loads whose switching priority is varied by the control unit in accordance with the specifiable conditions, and wherein in the choice of priorities of the loads, drive requirements are taken into account, so that a driver-dependent turn-on or turn-off of the loads takes place.

2. The method for switching loads of claim 1, characterized in that the loads are turned on or off as a function of priority, and the loads with the lowest priority at a given time are turned off first and turned on again last.

3. The method for switching loads of claim 1, characterized in that the loads are subdivided into the priority classes of "non-switchable loads" (NSV), "conditionally switchable loads" (BSV), and "switchable loads" (SV), with different switching priorities, with the priority decreasing in the order given.

4. The method for switching loads of claim 1, characterized in that the driver is recognized by the control unit (SG) by the evaluation of specifiable conditions that characterize the driver.

5. The method for switching loads of one of the foregoing claims, characterized in that the priorities are adapted in such a way that the perceptibility of the operating states is minimized, and in particular in the case of a seat heater, the switching priorities are adapted such that the intermittent turn-off is not perceived.

6. A method for turning on or off electrical loads in a vehicle on-board electrical system, by means of switch elements which are triggerable in such a way by a controller that the electrical loads are turned on or off taking switching priorities into account, characterized in that the electrical loads are grouped in classes of different switching priorities and the grouping of the electrical loads is done based on a normal state, the grouping of the electrical loads in classes with the switching priorities is variable dynamically during operation as a function of the operating state of the electrical loads, and the electrical loads can change their class belonging during the operation, wherein the switching of loads is performed by a control unit (SG) of a vehicle, and the loads are electrical and optionally also mechanical loads whose switching priority is varied by the control unit in accordance with the specifiable conditions, wherein in the choice of priorities of the loads, requirements of the on-board electrical system and/or of the drive train of the motor vehicle are taken into account, and wherein specifiable traits and preferences or habits of the driver and/or typical travel routes are recognized by the control unit (SG) and stored in memory and are also taken into account in the setting of the switching priorities.

7. A method for turning on or off electrical loads in a vehicle on-board electrical system, by means of switch elements which are triggerable in such a way by a controller that the electrical loads are turned on or off taking switching priorities into account, characterized in that the electrical loads are grouped in classes of different switching priorities and the grouping of the electrical loads is done based on a normal state, the grouping of the electrical loads in classes with the switching priorities is variable dynamically during operation as a function of the operating state of the electrical loads, and the electrical loads can change their class belonging during the operation, wherein in the choice of priorities of the loads, driver requirements are taken into account, so that a driver-dependent turn-on or turn-off of the loads takes place.

8. The method for switching loads of claim 7, characterized in that the driver is recognized by the control unit (SG) by the evaluation of specifiable conditions that characterize the driver.

9. A method for turning on or off electrical loads in a vehicle on-board electrical system, by means of switch elements which are triggerable in such a way by a controller that the electrical loads are turned on or off taking switching priorities into account, characterized in that the electrical loads are grouped in classes of different switching priorities and the grouping of the electrical loads is done based on a normal state, the grouping of the electrical loads in classes with the switching priorities is variable dynamically during operation as a function of the operating state of the electrical loads, and the electrical loads can change their class belonging during the operation, wherein specifiable traits and preferences or habits of the driver and/or typical travel routes are recognized by the control unit (SG) and stored in memory and are also taken into account in the setting of the switching priorities.

* * * * *